United States Patent [19]

Storace et al.

[11] 4,121,678

[45] Oct. 24, 1978

[54] WEIGHING SCALE WITH CORRECTION FOR NON-LINEAR SPRING

[75] Inventors: Anthony Storace, Tarrytown, N.Y.; Samuel G. Taylor, Darien, Conn.

[73] Assignee: Pitney-Bowes, Inc., Stamford, Conn.

[21] Appl. No.: 828,413

[22] Filed: Aug. 29, 1877

[51] Int. Cl.$^2$ .................... G01G 23/26; G01G 3/00
[52] U.S. Cl. .................................. 177/230; 177/225
[58] Field of Search ............... 177/225, 255, DIG. 9, 177/230

[56] References Cited

U.S. PATENT DOCUMENTS 3,942,597   3/1976   Karp ............................. 177/255 X

FOREIGN PATENT DOCUMENTS 1,123,734   9/1956   France ............................. 177/DIG. 9
823,443   11/1959   United Kingdom ..................... 177/225

Primary Examiner—George H. Miller, Jr.
Attorney, Agent, or Firm—Peter Vrahotes; William D. Soltow, Jr.; Albert W. Scribner

[57] ABSTRACT

A weighing scale is illustrated having a compensation for correcting the non-linearities of a load supporting spring.

The load support is caused to deflect, and the load spring caused to be put in tension as a weight is put on the load support of the scale. The load spring has a non-linear response, which is effectively eliminated by the compressor. The compensator comprises a frictionless-type rotatable drum which is operatively connected between the load support and the frame of the scale. The drum is not journalled, but rather, is free to rotate about a vertical plane in response to the deflection of the load support. The drum has movable weights to adjust its rotational moment, whereby the counter-force upon the load support is caused to be varied and the non-linear response of the spring is caused to be substantially linearized.

12 Claims, 2 Drawing Figures

WEIGHING SCALE WITH CORRECTION FOR NON-LINEAR SPRING

This invention pertains to the art of weighing scales, and more particularly to a compensating mechanism for linearizing the load supporting springs of a scale.

BACKGROUND OF THE INVENTION

Heretofore, it has been found that the non-linear response of load supporting springs could be corrected by means of a counter-balancing force. This force was introduced by a rotary member having adjustable weights to vary the rotational moment. The rotary member was attached to the load support such that a counter-balancing force was created when the load support deflected. The aforementioned compensating mechanism can be seen in the patent to:

E. C. Karp U.S. Pat. No. 3,308,900 Issued Mar. 14, 1967

Now it must be realized, that the prticular errors which are introduced by the springs are not very substantial. The load bearing springs are for all intended purposes substantially linear. However, the counter-balancing adjustment is made not just to provide an accurate scale, but to provide an extremely accurate scale. Therefore, even slight errors can become significant, where extreme accuracy is concerned.

This previous compensating concept is a very good idea in principle, but it has some serious drawbacks. It is to these drawbacks, that the present invention is addressed. The most serious problem with the prior art system is that the rotary element develops friction by means of its bearings. While bearings can be made almost frictionless, the introduced error (friction) in this particular case cannot be tolerated. This is so, because we are dealing with very minute errors in the first instance. In effect, the previous device took away one error only to introduce another error. What made the situation even worse, was the fact that the introduced error was more critical than the one which was being corrected. As the scale was used, the bearings would degrade, thus adding more and more frictional force to the counter-balance force.

The present invention has as one of its purposes, to provide a corrective system for spring non-linearities which would not have the drawbacks of the prior art devices.

SUMMARY OF THE INVENTION

The invention relates to a compensated weighing scale, wherein the non-linearities of the load supporting springs are substantially eliminated.

When a weight or load to be measured is placed on the pan of the scale, the load supporting structure (including the load supporting springs) is caused to deflect. A compensator is responsive to the deflection of the load support, and provides a counter-balancing force to the non-linear response of the springs. The compensator comprises a "free floating" drum, i.e., a drum which is not journalled or supported in bearings. The drum is supported by a plurality of bands. At least one of the bands is connected to the frame at one end thereof, and partially wrapped about the drum on its other end. At least another one of the bands is operatively connected to the movable load support structure at one end and partially wrapped about the drum on its other end. The effect of the bands is to dynamically suspend the drum in a so-called "free floating" state between the base or frame of the scale and the load support. The drum will rotate and translate in a vertical plane in response to the deflection of the load support. In doing so, the drum via said bands will exert a counterbalancing force upon the load support structure (including the non-linear springs). This will eliminate the non-linearities introduced by the springs. The drum has adjusting weights which can be set to match the non-linear forces of the springs. These adjusting weights can be in the form of screw shafts that can be threaded into, and out of, the drum. These screw shafts change the rotational moment of the drum, and thus, effectively change the balancing force exerted on the supporting structure.

Because the drum is "free floating", the drawback of the prior system is eliminated. In addition, there is a reduction in the cost of the system, since the bands are relatively much less expensive than bearings. Also, no shaft is required to support the drum, thus further reducing the cost of the compensating device.

It is an object of this invention to provide an improved compensating system for a weighing scale;

It is another object of the invention to provide a weighing scale having a substantially linear response to the placement of a load upon the weighing pan;

It is a further object of this invention to provide a compensating mechanism for the non-linearity of weighing springs in a weighing scale, which avoids the drawbacks of the prior art, and which further provides a cost reduction.

These and other objects of the invention will be better understood and will become more apparent with reference to the following detailed description taken in conjunction with the accompanying drawings, in which:

FIG. 1 is an internal side view of a weighing scale with the inventive compensating device shown in situ therein; and FIG. 2 is a perspective view of the inventive compensating device illustrated in FIG. 1.

DETAILED DESCRIPTION

Figure 1:
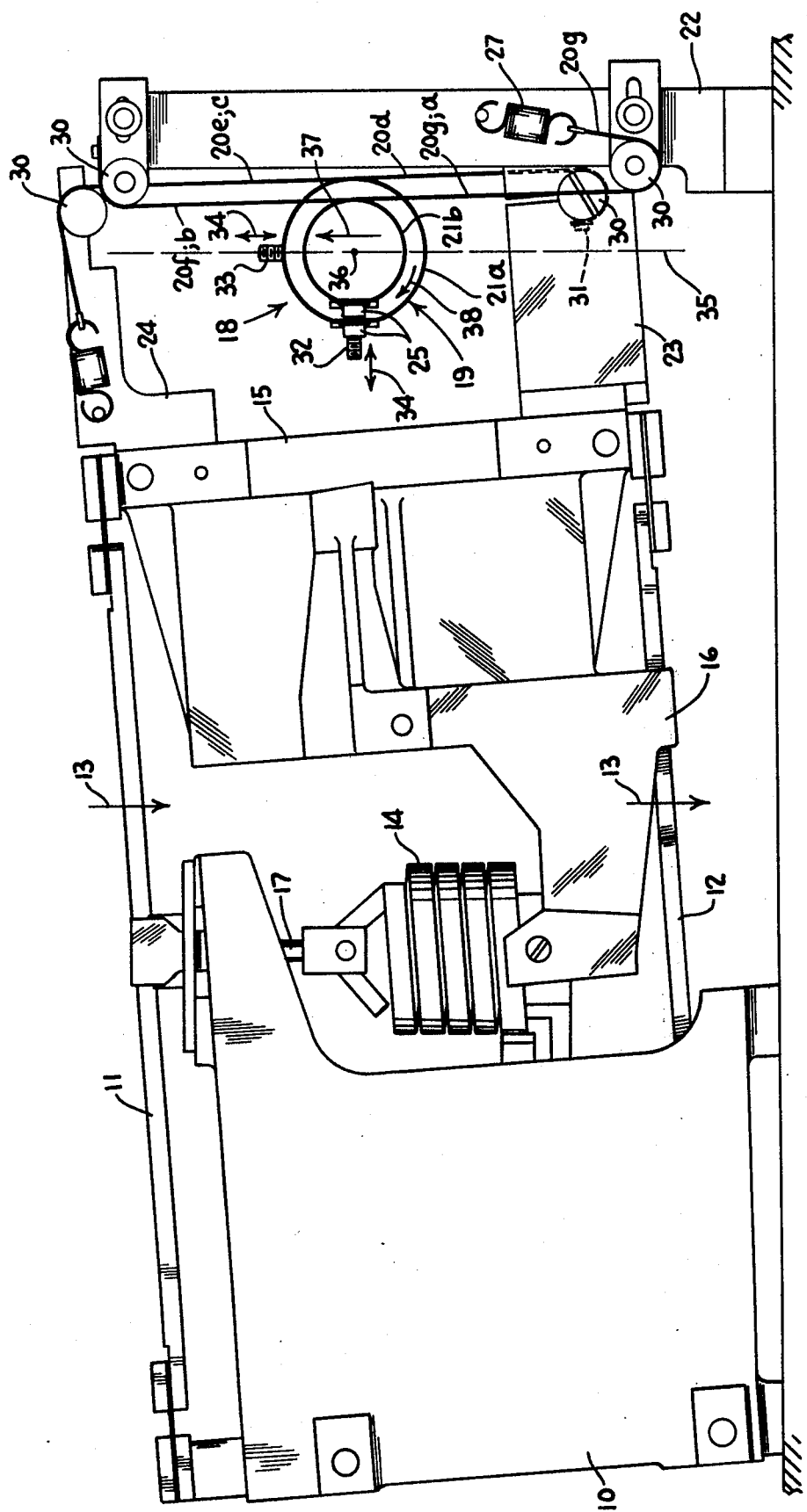

Now referring to FIG. 1, a weighing scale is depicted having a stationary frame or base 10. A load support of the scale comprised a weighing pan (not shown) and a pair of flexure pivot point arms 11 and 12, respectively. The pan is connected to the flexure pivot arms 11 and 12, which deflect (arrows 13) when a load to be weighed is placed on the pan. The pivot arms are connected to the frame 10 at one end thereof for pivotable support. A weight supporting spring 14 is connected to the pivot arms 11 and 12 via a flange member 16 and a wall 15, and is connected to the frame 10 via extension rod 17.

When a weight is placed on the weighing pan (not shown), the pivot arms 11 and 12 will be caused to movably deflect (arrows 13), thus putting tension on the load supporing spring 14. The weighing scale may actually comprise two (or more) load springs 14, one on each side of the scale, in order to evenly balance the load forces. The spring(s) 14 carries the weight of the load, and is designed to be fairly linear throughout a given weighing range.

However, the springs(s) 14 does have a certain non-linear response to the load structure deflection, which necessitates the present inventive compensation device 18. The compensation device 18 is designed to provide a counter-force on the load supporting springs 14 equal and opposite to the degree of non-linearity produced by the springs. The compensating device has means for adjusting the counter force to accurately balance the degree to which the spring 14 is off from a linear value.

Figure 2:
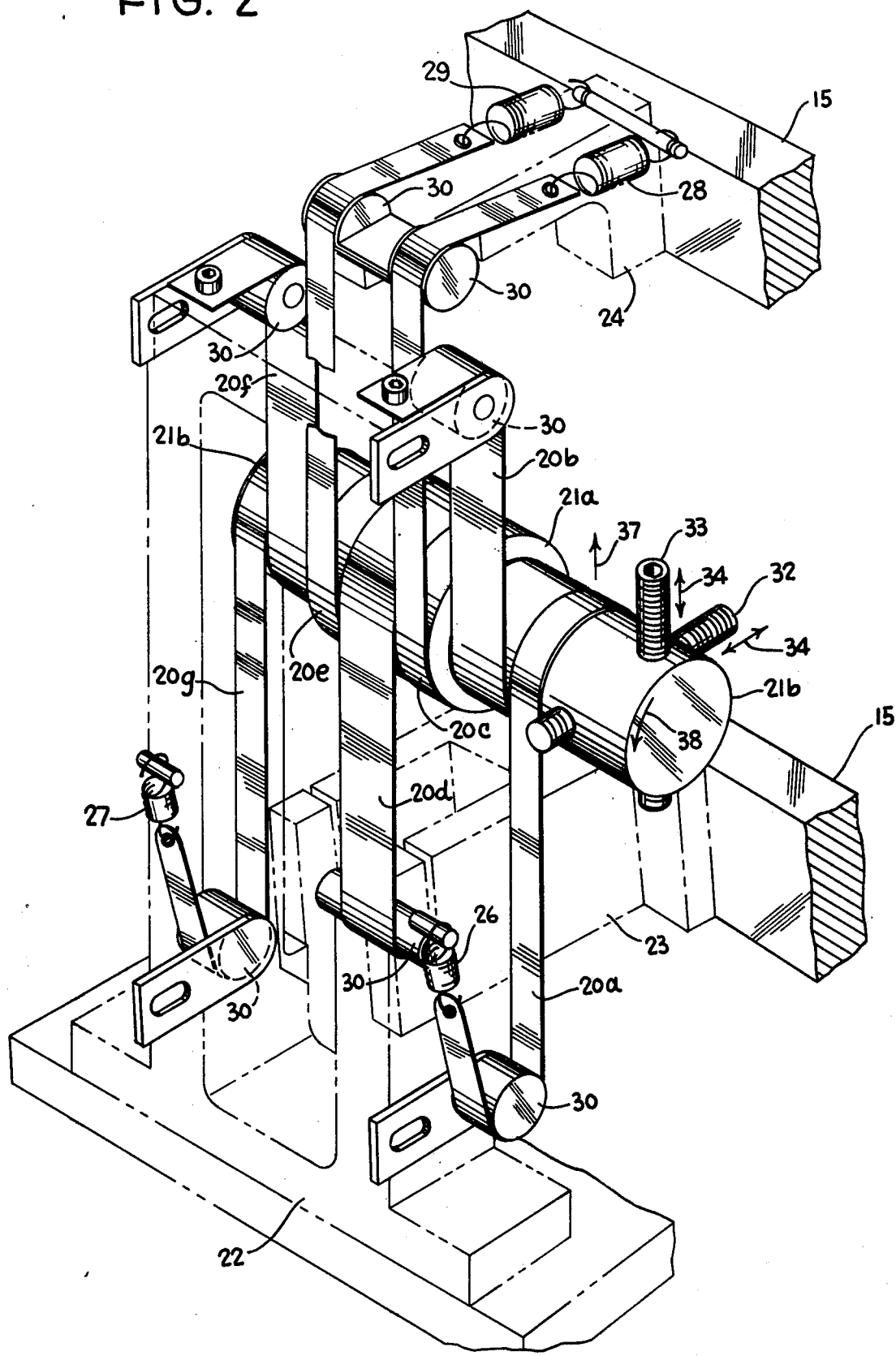

The invention has as one of its main objects to reduce the friction associated with the compensating device, so that the counter-force will evenly match the degree of non-linear forces induced by the spring 14. To this end, the compensating device has been constructed as a "free floating" drum 19, which is substantially frictionlessly suspended bwtween the stationary frame or base 10, and the movable load support. The drum 19 has this "free floating" quality by being supported by a plurality of flexible bands 20a-g which can better be seen with reference to FIG. 2.

The drum 19 is constructed in a tier arrangement, such that it comprises two levels or diameters 21a and 21b, respectively. Bands 20a, 20b, 20f, and 20g are each wrapped about the smaller diameters 21b of drum 19, while bands 20c, 20d and 20e are each wrapped about the larger diameter 21a of drum 19. The bands 20a, 20b, 20f and 20g are each connected to the stationary wall 22 (FIG. 1), which is an extension of the base or frame 10. The bands 20c, 20d and 20e are each connected to the movable load support wall 15 via flange members 23 and 24 respectively.

The difference in the drum diameters 21a and 21b determines the degree of rotation with which the drum 19 will rotate for a given deflection (arrows 13) of the load support.

All of the bands 20a-20g are wrapped, and then anchored to the drum via pins 25 (illustrated in part in FIG. 1).

Bands 20a and 20g are connected to frame 22 via springs 26 and 27, respectively. The springs 26 and 27 provide tension in the bands, so that there is no slippage between the bands and drum 19.

Similarly, bands 20c and 20e are connected to the movable support structures 24 and 15 via springs 28 and 29, respectively. These springs are for the same prupose of preventing slippage between the bands and the drum 19.

All the bands are supported on their ends by capstans 30, which provide for a smooth transitional bend. The center band 20d is wrapped about and anchored to its capstan 30 via a pin 31 (FIG. 1).

The drum 19 comprises two weighted members 32 and 33, respectively, which are shown in the form of screw threaded shafts. These shafts are threadably movable into and out of the drum (arrows 34) by means of rotation. As these shafts are rotated into, or out of, the drum 19, the rotational moment of the drum is varied. Since the force upon the bands 20, and hence, upon the supporing structure 15, is dependent upon the rotational moment of the drum 19, the movement of the weights 32 and 33 provides adjustment of the counter-balancing force upon spring(s) 14.

OPERATION OF THE INVENTION

The compensator 18 of this invention operates to counteract that portion of the spring force of spring(s) 14 which is non-linear. This is achieved in the following manner: As the load support is caused to defect under load (arrows 13), the drum 19 is caused to rotate (arrow 30) about its center axis 36 and translate upwards along the vertical axis 35 (arrows 37). This movement of the drum results from the tension created in the supporting bands 20 when the support structure deflects.

The rotational moment produced by the drum 19, causes a counter-balancing force to be exerted upon the support structure, which is indirectly exerted upon the support springs 14. Because the weights 32 and 33 change position with the drum rotation, a non-linear counter-balancing force is produced. This non-linear force can be adjusted, as aforementioned, by means of weights 32 and 33. Thus, whatever the particular non-linearity, the weights can be adjusted therefor.

The particular arrangement and structure of the adjustment weights are exemplary, and can be designed to fit the particular requirements of the scale in question. Similarly, the particular design of the band arrangement can also vary according to the exigencies and necessities of the scale. In the present design, seven bands 20 are used, because this was a convenient number needed to symmetrically balance the forces. Theoretically speaking, however, only a pair of bands is needed, one connecting the drum to the load support, and another connecting the drum to the frame or base.

Because the drum rotates upon the bands and moves relative to them, very little friction is developed in the compensator, and the drum may be thought of as being in a "free floating" state of support. It is this "free floating" state of support which overcomes the previous drawbacks of the prior art systems.

Having thus described the invention, what is desired to be protected by Letters Patent, is presented by the following appended claims.

What is claimed is:

1. A weighing scale, comprising:
a frame;
a load support means being movable with respect to the frame and in response to a load being weighed;
biasing means disposed between said frame and said load support means, said biasing means supporting said load being weighed, and having a non-linear load supporting response to said load;
a non-linearity compensating means operatively connected between said movable load support and said frame for compensating for the non-linear response of said biasing means, said compensating means including a rotatable drum having means supported by the drum for adjusting the rotational moment of said drum, and at least one pair of drum supporting bands, a first band of which is operatively connected between the load support means and the drum, and a second band of which is operatively connected between the frame and the drum, whereby as the load support means moves in response to the load, the drum will be caused to rotate in response to the movement of the load support means, the rotational moment of the drum causing a balancing non-linear response of said biasing means, thus tending to cancel the non-linearity of said biasing means.

2. The weighing scale of claim 1, wherein each band of said pair of bands is partially wrapped upon said drum in an opposite rotational direction with respect to each other.

3. The weighing scale of claim 1, wherein said means for adjusting the rotational inertia of the drum includes at least one weighted member movably supported about said drum, and movable with respect to a rotational axis of said drum.

4. The weighing scale of claim 1, wherein said drum is supported by said pair of bands in order to be translationally movable along a plane running through a rotational axis of said drum in response to the movement of said load support means, whereby a minimum of friction is experienced in support of the drum.

5. The weighing scale of claim 1, wherein said means for adjusting the rotational moment of the drum includes a pair of threaded shafts disposed transversely of each other and each movable with respect to a rotational axis of said drum.

6. The weighing scale of claim 1, wherein there are seven drum supporting bands, three of which are connected between the drum and the movable load support means, and four of which are connected between the drum and the frame, each of said seven bands being partially wrapped upon said drum.

7. A weighing scale, comprising:
a frame;
a load support means being deflectable with respect to said frame and in response to a load being weighed; a spring means disposed between said load support means and said frame for supporting the load being weighed, said spring means having a non-linear load supporting response to said load;
a non-linearity compensating means operatively connected between said load support means and said frame for compensating for the non-linear response of said spring means, said compensating means including a band-supported drum that is rotatable in response to deflection of said load support means, means supported by the drum for adjusting the rotational moment of the drum and a plurality of drum supporting bands, a first band of said plurality being operatively connected between the load support means and the drum, and a second band of said plurality being operatively connected between the frame and said drum, whereby the drum is freely supported between the load support means and the frame for rotational and translational movement between said frame and said load support means.

8. The weighing scale of claim 7, wherein each band of said pair of bands is partially wrapped upon said drum in an opposite rotational direction with respect to each other.

9. The weighing scale of claim 7, wherein said means for adjusting the rotational inertia of the drum includes at least one weighted member movably supported about said drum and movable with respect to a rotational axis of said drum.

10. The weighing scale of claim 7, wherein said drum is supported by said pair of bands in order to be translationally movable along a plane running through a rotaional axis of said drum in response to the movement of said load support means, whereby a minimum of friction is experienced in support of the drum.

11. The weighing scale of claim 7, wherein said means for adjusting the rotational inertia of the drum includes a pair of threaded shafts disposed transversely of each other and each movable with respect to a rotational axis of said drum.

12. The weighing scale of claim 7, wherein there are seven drum supporting bands, three of which are connected between the drum and the movable load support means, and four of which are connected between the drum and the frame, each of said seven bands being partially wrapped upon said drum.

* * * * *